Dec. 14, 1943.  O. NÜBLING ET AL  2,336,631
GEARING FOR AIRCRAFT
Filed Oct. 16, 1939  3 Sheets-Sheet 1
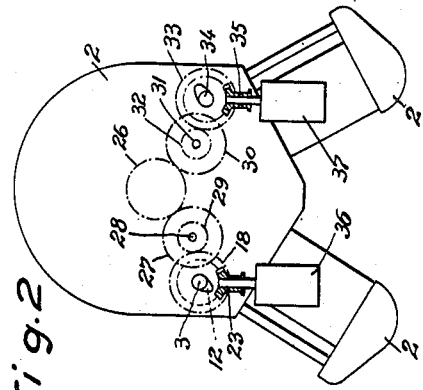
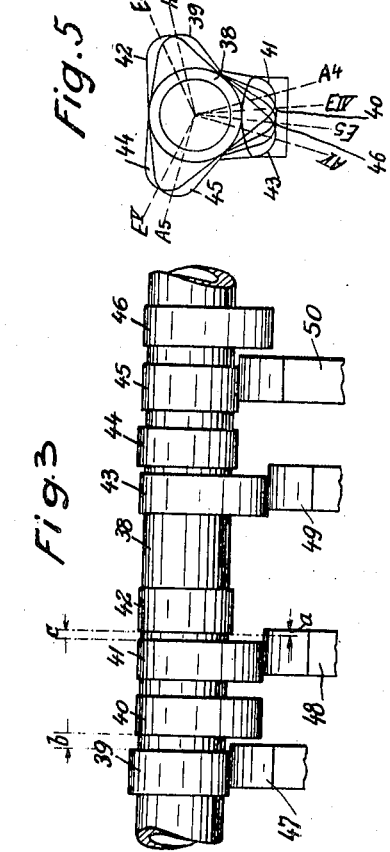
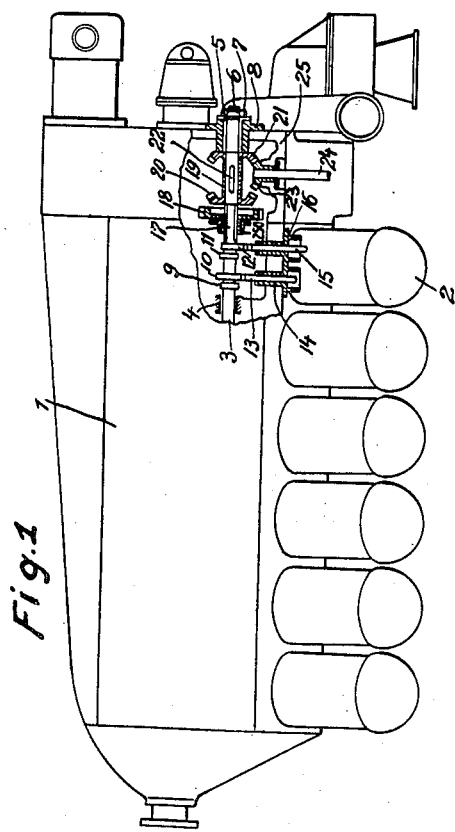
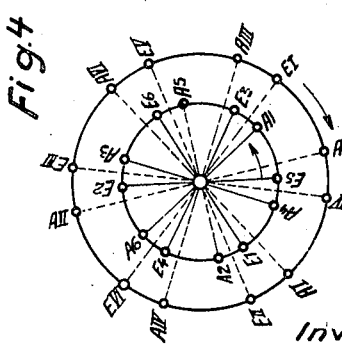
Inventors
Otto Nübling
Erich Wirthgen
By Williams, Bradbury,
McCaleb & Hinkle
Attorneys.

Dec. 14, 1943.　　O. NÜBLING ET AL　　2,336,631
GEARING FOR AIRCRAFT
Filed Oct. 16, 1939　　3 Sheets-Sheet 2

Inventors.
Otto Nubling
Erich Wirthgen
By Williams, Bradbury,
McCabe & Hinkle
Attorneys.

Dec. 14, 1943.  O. NÜBLING ET AL  2,336,631
GEARING FOR AIRCRAFT
Filed Oct. 16, 1939  3 Sheets-Sheet 3
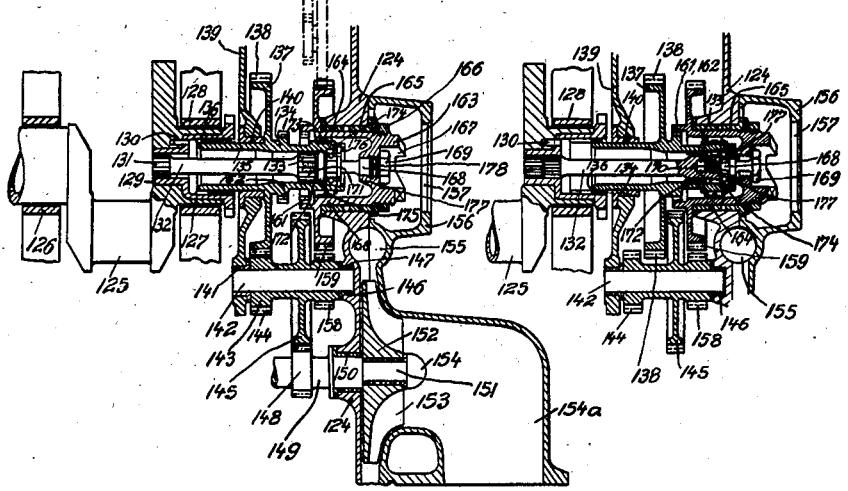
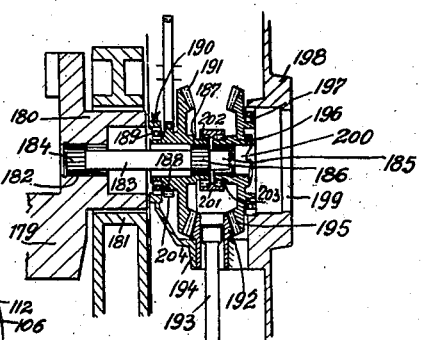
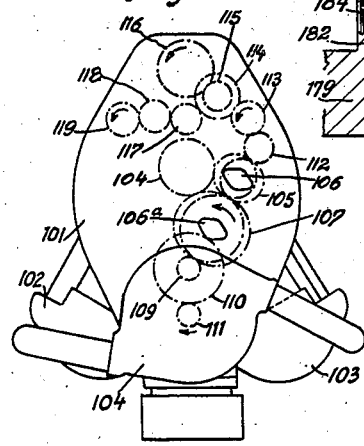
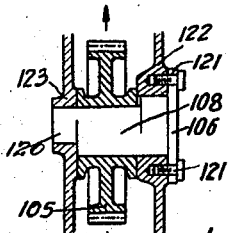
Inventors.
Otto Nübling
Erick Wirthgen
By Williams, Bradbury,
McCalet & Hinkle
Attorneys.

Patented Dec. 14, 1943

2,336,631

UNITED STATES PATENT OFFICE 2,336,631

GEARING FOR AIRCRAFT

Otto Nübling, Berlin-Frohnau, and Erich Wirthgen, Berlin-Reinickendorf, Germany; vested in the Alien Property Custodian Application October 16, 1939, Serial No. 299,652
In Germany November 7, 1938

4 Claims. (Cl. 123—41)

The present invention relates to gearing which is particularly designed and adapted for aircraft and which provides for changing the direction of rotation of the driving member, for example the propeller of an airplane. There is also provided means for maintaining a constant direction of rotation of the auxiliary apparatus, for example the ignition device, the supercharger, the dynamo, the air compressor and so on. Preferably, an ordinary combustion engine is used as a prime mover.

The present invention is not concerned with a so-called reversible internal combustion engine of usual construction, i. e. an engine which during its operation may be adjusted to reverse its direction of rotation by a simple manipulation of a lever system or the like. But the invention is concerned primarily with a gearing which does not require many additional parts, and those required are adapted to the space and weight limitations of aircraft. The motor is to be reversed in a simple manner, and all means are provided in the motor itself to make the adjustment, which eliminates the difficulty of not having proper tools and extra equipment at hand.

The gearing according to the present invention is to serve various purposes. One of its main purposes is to provide particularly favorable service conditions for motors of aircraft, and particularly in aircraft provided with a plurality of motors.

It has been found that it is advantageous, in connection with aircraft having a plurality of motors, to build the motors so that the propellers will rotate in clockwise and counter-clockwise directions. For this purpose it has been proposed to provide clockwise and counter-clockwise rotating gears for the propellers and to build in these gears, according to demand.

The last mentioned proposal, however, did not give satisfactory results, primarily because the different directions of rotation required two sets of reduction gears for a motor which always drives in the same direction. If reduction gears of different reducing ratios are used, the number of the individual parts, which must be provided in duplicate and kept in stock for the flying service, must then be multiplied in accordance with the reduction required.

Moreover, when the propeller shaft is rotated in a direction opposite to that of the crankshaft, extreme difficulty of design has been encountered due to the fact that the moment acting upon the crank case is equal to the sum of the torsional moments or torques produced by the propeller plus the moments of the crankshaft. Due to this relatively large torsional moment or torque the crank case is subjected to extreme stresses and expensive and complicated arrangements are necessary to take up these stresses.

If, however, the reduction gear rotates in the same direction as the crankshaft and the propeller shaft, only the torque differences produced by the propeller shaft and the crankshaft act upon the crank case.

It has been found that gearing may be provided which will permit both directions of rotation. Such gearing need be used only when the propeller shaft and the crankshaft rotate together in either direction and the aggregate auxiliary apparatus of the motor may maintain the same direction of rotation so that on reversal of the motor an exchange of this apparatus is not necessary.

All these requirements are fulfilled according to the present invention by the fact that the members which control the change of rotation are housed upon stopping the motor, by very simple auxiliary means, in accordance with the altered direction of rotation of the crankshaft. The driving means for the auxiliary apparatus is provided with reversible intermediate driving members which allow the driving means for the auxiliary apparatus to drive constantly in one direction.

The cams which are changed during the reversing operation are so arranged that the control rods of the cylinder valves of the engine associated with the cams are prevented from further cooperation with one set of cams and caused to directly cooperate with the other set of cams.

For this purpose the cams provided to control the rotation in the opposite direction are arranged on their shaft in axially and radially staggered relation with regard to each other in such manner that on changing the basic control position the shaft may be axially displaced to the extent of the distance between the staggered cams and the distance of the cams from each other (smallest distance for reasons of manufacture), whereupon the shaft is rotated 180° and then is finally shifted axially for the remainder of the distance still necessary to effect a complete changeover.

The above described construction of the cams and the arrangement of the latter upon the camshaft have the advantage that special changeover surfaces between the individual cams are not required. Moreover, lifting of the valve tappets is not required with the construction and arrangement of the cams according to the present invention.

The actuation means of the prior art such as levers, forks, sleeves, and associated systems is dispensed with according to the present invention and replaced by a simple guide bearing having a connecting flange offset from the middle of the bearing. This bearing will be more fully described hereinafter.

In describing the invention a twelve cylinder motor is shown with two cam shafts journalled in the crank case. It is to be understood of course that any internal combustion engine may be used. Each cam shaft carries a set of twelve cams for counter-clockwise rotation and a set of twelve cams for a clockwise rotation, six cams of each set of twelve serve to control the intake valves and six cams of the set are used to control the exhaust valves. The cam shafts are guided in bracket bearings in the crank case. The offset flange of the bearing is so arranged that if the bearing is mounted inversely, the cam shaft is positioned in the correct longitudinal position for an opposite direction of rotation than is obtained by the previous position. By altering the basic control position of the camshaft, a reversal of the gearing is effected.

The guide bearing of the cam shaft which is brought into the new basic control position is fixed after the changeover is effected. The corresponding ignition cables of the distributor are exchanged; the reversible gearing for the means driving the auxiliary apparatus and connected to the cam shaft by way of the crankshaft are operated and reversed. This change-over has the result that for the new basic control position of the cam shaft, the direction of rotation of the driving means for the auxiliary apparatus remains unchanged and constant. The auxiliary apparatus, as for example the supercharger, the distributor, the dynamo or generator, the air compressor, the lubricating pump, the fuel pump, the revolution indicator, are mounted on a special casing and driven by the crankshaft by means of a common driving gear.

The gearing according to the present invention has various advantages. The individual auxiliary apparatus need not as hitherto be confined to a single block to allow reversal whereby the block as a whole had to be exchanged for another block.

The gearing according to the invention, moreover, has the advantage of being provided with all parts required for the various basic control positions (clockwise and counter-clockwise rotation). The reversal itself, i. e., the change of the basic control position from clockwise rotation to counter-clockwise rotation may be effected in a short time and at any desired place. Which basic control position is in use may be indicated by providing indicia on the outside of the reversing members, for example by applying a dye of a special color for each direction of rotation in such a manner that persons not familiar with the arrangement may be able to ascertain at once the direction of rotation adjusted.

From the foregoing discussion it will be seen that it is an object of the present invention to provide a gearing for an internal combustion engine, the driving members of which are capable of being interchanged, which gearing will drive the auxiliary apparatus of the internal combustion engine in a constant direction.

It is a further object of the present invention to provide a gearing for an internal combustion engine consisting of two driving gears which are alternately engageable with a driven gear to drive the auxiliary apparatus of the internal combustion engine in a constant direction.

It is a further object of the present invention to provide a driving gear for an internal combustion engine which alternately engages either of two driven gears to drive the auxiliary apparatus of the internal combustion engine in a constant direction.

It is a further object of the present invention to provide a driving gear which may be oscillated on its driving mounting to alternately engage either of two intermediate driven gears to drive the gearing of the auxiliary apparatus in a constant direction.

It is a further object of the present invention to provide a gearing for an internal combustion engine which is capable of being reversed, which gearing is driven by a displaceable shaft so that the auxiliary apparatus may be selectively connected to one or the other of two driving gears to drive the auxiliary apparatus in a constant direction.

It is a further object of the present invention to provide means on the camshaft whereby the order of firing the cylinders is changed to effect a changed direction in which the crankshaft drives.

Other objects and advantages of the present invention will be explained more fully in the following description, reference being had to the accompanying drawings in which:

Fig. 1 is a side elevation of a twelve cylinder motor, in this case an airplane motor, partially in section;

Fig. 2 is a rear view of the construction illustrated in Fig. 1 showing diagrammatically some particularly important members;

Fig. 3 is an elevation on enlarged scale of a portion of a cam shaft having four control cams for each of the two control rods or tappets of the valves of a cylinder;

Fig. 4 shows the well-known control diagram representing the various intake and exhaust positions of the different cams;

Fig. 5 is an end view of the construction illustrated in Fig. 3 showing the positions of the various cams;

Fig. 6 is a sectional view illustrating another modification taken substantially along the line VI—VI of Fig. 7 showing an oscillatable stepped gear wheel provided for driving the auxiliary apparatus of the motor in a constant direction;

Fig. 7 is a sectional view taken on line VII—VII of Fig. 6, the section illustrating the main parts only;

Fig. 8 shows another modification of the construction illustrated in Figs. 1, 2 and 6, 7; according to this modification a fixed main driving gear and two selectively swingable intermediate driving gears are provided which by their alternate oscillation allow the auxiliary apparatus to be driven in a constant direction;

Fig. 9 is a section of a detail of the construction illustrated in Fig. 8;

Figs. 10 and 11 show another modification. Fig. 10 shows the reversible gearing in one position and Fig. 11 shows the same gearing in the second position. The reversal of the gearing in this construction is made possible by the fact that a pinion may be axially displaced and may be brought into alternate engagement with intermediate driving members to permit the auxiliary apparatus to maintain a constant direction of rotation, and Fig. 12 is a section through still another construction of the reversible gearing for the auxiliary apparatus.

The construction shown in Figs. 1 and 2 is particularly adapted to drive the individual auxiliary apparatus, in particular the lubricating pump and the fuel pump, the driving power for which is derived from the cam shaft.

The crank case is designated by the reference numeral 1. The motor cylinders 2 are set at an angle to the crankshaft in an inverted V-fashion. The shaft 3 is provided with cams and is journalled at 4 in a journal bearing 4a. A second journal bearing 8 is arranged at the end face of the crank case and is provided with a bushing 5. The outwardly extending portion 6 of the cam shaft has a thread and is adapted to receive a nut 7.

The bushing 5 is arranged in the interior of the bearing 8 and mounted on the shaft 3 in such manner that the bearing 8 and the bushing 5 may be manually secured in two positions. In the first position one of the bevel gears 21, described in detail below, engages the bevel gear 23 which drives the associated auxiliary apparatus, and in the other position of the bearing 8 the bevel gear 20 engages the aforementioned bevel gear 23.

The cams 9, 10, 11 and 12 are mounted on the shaft 3. The cams 9 and 10 form one series and cooperate alternately with the control rod or tappet 13 of the intake valve of the cylinder 2. The control rod 13 is in its axial direction displaceably mounted in a guide 14.

The second series of cams 11 and 12 cooperate with the control rod or tappet 15 which controls the exhaust valve of the cylinder 2 of the internal combustion engine. The control rod 15 is mounted in an axial guide 16 in a similar fashion to the rod 13.

Looking from the cams towards the bushing 5 and the bearing 8 the cam shaft 3 has a splined section 17 on which is mounted drive gear 18 journaled in the crankshaft by a side bracket bearing 25a. In all positions of the crankshaft 3 the gear 18 maintains its position with relation to the crank case 1. The gear 18 drives the cam shaft and is adapted to engage a corresponding gear mounted upon the crankshaft of the internal combustion engine. Gear 18 may also drive the cam shaft through a sliding key mounting.

Adjacent the driving gear 18 (and in the direction towards the bearing 5), there is provided a sleeve 19 which is so mounted on the cam shaft 3 as to be capable of being axially displaced. The ends of the sleeve 19 carry bevel gears 20 and 21, the teeth of which face each other.

The bevel gears 20 and 21 may be brought into alternate engagement with bevel gear 23 which is fixed upon a shaft 24 in a manner not shown in detail in the drawings. The shaft 24 is connected to the driving mechanism of the auxiliary apparatus. The bevel gear 23 as well as the shaft 24 are journaled in the portion 25 of the crank case of the internal combustion engine.

Referring more particularly to Fig. 2, the driving gear 26 is fixed to the crank-shaft of the internal combustion engine and is adapted to engage gear 27 which is rotatably mounted upon the shaft 28. A second gear 29 is rotatably mounted upon the shaft 28 and rigidly connected to the gear 27. The drive gear 29 is in turn adapted to engage the aforementioned gear 18 which is slidably mounted on section of the cam shaft 3 by means of splines or keys.

The gear 26, mounted upon the crank-shaft, is adapted to engage a drive gear 30 rotatably mounted upon a shaft 31. Also rotatably mounted upon the shaft 31 is a second gear 32 rigidly connected to the drive gear 30, which is adapted to engage another drive gear 33 which corresponds to drive gear 18 and is mounted on cam shaft 34 in a manner similar to the mounting of gear 18. The cam shaft controls the valve of the second group of cylinders arranged in the inverted V-fashion. The drive shaft 35 for the auxiliary apparatus corresponds to the drive shaft 24 heretofore described. The oil pump of the auxiliary apparatus is designated by the reference numeral 36 and the fuel pump is designated by the reference numeral 37. The gear 23 is adapted to drive the pump 36 and the member 35 is adapted to drive the pump 37.

In Fig. 3 the cam shaft 38, only a small portion of which being shown, carries a series of eight cams 39, 40, 41, 42, 43, 44, 45 and 46. Any two of these cams form a group for alternately actuating a coordinated valve tappet for a cylinder of an internal combustion engine. Thus it will be seen that a group is formed by the cams 39, 40, another group by the cams 41, 42, another group by the cams 43, 44 and still another group by the cams 45, 46. The cams 39 and 40 cooperate with the tappet 47, the cams 41, 42 with the tappet 48, the cams 43, 44 with the tappet 49 and the cams 45, 46 with the tappet 50.

The cams 39 and 40 are axially spaced from each other a predetermined distance $b$, the cams 41 and 42 are axially spaced from each other a predetermined distance $c$, and the vertical projection of the cam 42 overlaps the tappet 48 a predetermined distance $a$.

In Fig. 3 the control surfaces of the cams 39, 42, 44 and 45 are directed upward, whereas the control surfaces of the cams 40, 41, 43 and 46 are directed downward. In the group of cams 39, 40, 41 and 42 controlling the valve tappets of cylinder No. 4 of the internal combustion engine cams 39 and 42 are directed upward whereas cams 40 and 41 are directed downward.

Of the group of cams 43, 44, 45, 46, which serve to actuate the valve tappets of the cylinder No. 5 of the internal combustion engine, cams 43 and 46 are directed downward, whereas cams 44 and 45 are directed upward.

Of the tappets 47 and 48 of the cylinder No. 4, the tappet 47 arranged at the left hand side occupies the upper position, and the corresponding tappet 49 of the cylinder No. 5 occupies the lower position. The tappet 48 of the cylinder No. 4 arranged at the right hand side occupies the lower position, and the corresponding tappet 50 of cylinder No. 5 occupies the upper position.

The various tappets and their positions may be seen in part from the end view shown in Fig. 5 and from the control diagram shown in Fig. 4. In the last mentioned figures the capital letters E and A designate the exhaust and intake respectively, while the Roman figures designate a basic control position and the Arabic figures designate the other basic control position. Furthermore, the figures 1-6 and I-VI respectively designate the cylinders of a six cylinder internal combustion engine or of one band of cylinders of the 12 cylinder V-type engine illustrated. The ignition is effected in the succession 1, 5, 3, 6, 2, 4 for the rotation of the crankshaft in the clockwise direction and 1, 4, 2, 6, 3, 5 for the rotation in the counter-clockwise direction.

Reversal of the internal combustion engine may be accomplished as follows: The engine is stopped, whereupon the cam shaft (Fig. 3) is shifted to the left about 2 mm. and the distance $e$ until some of the cams abut against adjacent tappets. Another portion of the cams thereby is moved about the distance $a$ over the coordinated valve tappets. Note that cam 42 overlaps tappet 48 the distance $a$. Thereupon, the cam shaft is rotated about 180°, whereby such cams overlapping the coordinated valve tappets for the distance $a$ are caused to actuate these tappets. After a rotation of 180° has been effected, the cam shaft may be shifted further towards the left for the rest of the distance necessary to accomplish full displacement.

Before carrying out these operations the bevel gear 20 had been in engagement with the bevel gear 23 in the manner hereinbefore described. After carrying out these operations and after the shifting of the cam shaft towards the left has been effected, the bevel gear 20 no longer engages the bevel gear 23, but now the bevel gear 21 is in engagement with the bevel gear 23.

After the displacement of the control shaft towards the left has been terminated, the reversible bushing 5 and bearing 8 is fixed and the cam shaft is placed in its new operative position. Two other cams now operate the tappets for the intake and the exhaust respectively. Consequently, the internal combustion engine is, according to the arrangement and construction of the cams shown in Figs. 3, 4, and 5, reversed in such a manner that the crankshaft now rotates in opposite direction to that in which it rotated before the reversal of the cam shaft was effected. The direction of rotation for the auxiliary apparatus, however, is the same as before, because the change gearing 20, 21, 23 has also been reversed during displacement of the cam shaft.

In the modification shown in Figs. 6 and 7 the crank case of the internal combustion engine is designated as 51. The cylinders shown partially in front elevation only are designated 52 and the geometrical axis of the crankshaft is designated 53. Around the shaft 53 a main driving gear 54 is rotatably mounted on shaft 53. The gear 54 is provided with internal teeth 80 which are engaged by the teeth on gear 55 in such a manner that in any position of the gear 55 it is always in engagement with the surrounding gear 54. The gear 55 is formed as a spur gear and fixed upon a sleeve to which is also fixed another spur gear 56. The gear 56 may be positioned in a manner similar to the gear 55, the positioning being positively effected together with the positioning of the gear 55. According to which positions gears 55 and 56 have been placed, the gear 56 either engages a spur gear 57, or another spur gear 61. The two gears 57 and 61 are in engagement with each other.

If the gear 56 engages the gear 57, the latter receives a counter-clockwise rotation (Fig. 6). This rotation is transmitted in the same or opposite direction to all the spur gears 61–72 connected in gear train to the gear 57.

Reversed direction of rotation of each individual spur gear connected in the gear train 61–72 results if the gear 56 engages the gear 61 when this latter engages the gear 57 as any two gears engaging each other rotate, as is well-known, in opposite directions.

The gear 61 is connected by way of the pinion 62 with the drive gear 63 for the dynamo or generator. Moreover, the pinion 62 engages the gear 64 upon the shaft of which another gear 65 is fixed which engages a gear 66. The latter drives a spur gear 67 serving to drive the magneto ignition device. The already mentioned spur gear 64 also drives a spur gear 69 for the air compressor by way of the spur gear 68. From the latter the driving power for a gear 70 is derived which directly engages the gear 68. The gear 70 is in engagement with another spur gear 71 which drives a gear 72 for actuating the lubricant pump.

By way of the spur gears 58 and the gear 59 mounted on the shaft carrying the gear 58 the gear 57 drives another spur gear 60 by means of which the supercharger of the internal combustion engine is operated.

In the construction shown in Fig. 7 the crank pin of the crankshaft of the internal combustion engine is designated 73. Connected to the one cheek or side wall of this crank pin 73 is a hollow pin 74 journalled in a slide bearing 75. Inserted into the recess of the pin 74 is a sleeve 76 which is a drive fit. The inner surface of sleeve 76 is provided with teeth, serrations or grooves 83 which engage corresponding teeth or ribs of a torsional member 82. The ribs of the torsional member 82 engaging the grooves 83 of the sleeve 76 transmits the torque elastically from the crankshaft 73 to the connected gearing elements. A large portion of the length of the torsional member 82 is surrounded by a sleeve 77 carrying various gears 54, 55 and 56. The sleeve 77 is provided with a projection which is journalled in the bearing 78. The bearing 78 may be carried by the crank case 79. The portion of the sleeve 77 supported by the bearing 78 is continued to form the gear 54 surrounding the sleeve 77. This gear 54 is provided with the already mentioned internal teeth 80. The sleeve 77 and the inside of the crankshaft pin 74 are provided with rib-like supporting members 251 with sufficient play to prevent overloading of the torsional member 82, during starting. The end of the member 82 not cooperating with the crankshaft 73 is provided with a piston-like enlargement having externally axially arranged ribs, teeth or serrations 84. The latter engage corresponding grooves or teeth in the end 85 of the sleeve 77 which protrudes from the crank case. The end 85 is journalled in ball bearing 86 in a sleeve 87 which is in turn journalled in the end wall of the crank case. Flange 88 of the sleeve 87 is held against the end wall of the crank case by means of a cap screw 89. This screw also mounts a disc 90 which is provided with a central bore.

The face of the end 85 of the sleeve 77 is provided with a flange to which a flange disc 91 is fixed. The disc 91 has a recess 92 in its center which is adapted to receive a crank. The walls of this recess 92 are provided with inclined recesses or notches which permit the crank to be coupled to the disc when the crank is turned in one direction, but the crank is disengaged as soon as it is rotated in the opposite direction. This has the advantage that return shocks of the crankshaft are not transferred to the starting crank when the engine starts.

The above mentioned sleeve 87 is made integral with the eccentric sleeve 93 and is mounted on the crank case by means of flange 88. The sleeve 93 surrounds the sleeve 77 in a spaced relation. Rotatably and swingably mounted upon the sleeve 93 is a member 94 which carries two spur gears which are formed with the same axis but have different diameters. One of these gears is designated as 55 and its function has already been described in connection with the description of Fig. 6. The other gear designated as 56 has also been described.

The position into which the member 94 has been swung determines the point at which the gear 55 comes into engagement with the teeth of gear 54 driven by the crankshaft 73 through the torsion member 82. This gear 54 rotates the gear 55, whereby the member 94 and also the gear 56 are rotated. By rotating the sleeve 93, 87 about its longitudinal axis the member 94 is lifted or lowered. Fig. 7 shows the lowered position of the eccentrically mounted gear 56 as it is lifted or lowered and selectively brought into engagement with either the gear 61 (see Fig. 6) or the gear 57 (see Figs. 6 and 7).

In the position shown in Fig. 7 the gear 56 engages the gear 57 which in turn engages the gear 58 the hub of which is rigidly connected to the hub of a gear 59. The latter engages a gear 60 upon the shaft which also mounts the member 95 which carries the vanes 96 of a supercharger. If the vanes 96 are rotated, air is drawn in through the mouth 97 and is forced into the channel 98 surrounding the vanes 96. The channel 98 is formed by the crank case of the internal combustion engine and by a joined special casing 99. Casing 99 has a recess 100 through which access may be had to the members 91, 92 to start the motor.

When the control position of the cam shaft is changed and the direction of rotation of the crankshaft of the combustion engine is correspondingly changed, then the sleeve 93 is rotated to swing the eccentric provided on said sleeve so that the gear 56 is brought into engagement with another spur gear. Thus, if gear 56 is disengaged from the gear 57 it will be engaged with the gear 61, or if it is disengaged from the gear 61, it is engaged with the gear 57. By this change of engagement the altered direction of rotation of the crankshaft is not communicated to the auxiliary apparatus and these continue to rotate in the same direction.

If the motor is started with a centrifugal starter having a large starting torque it is preferable to have the starter act directly upon the crankshaft, i. e., the starting is not effected through the member 82 because the torque load would be too great for that member to carry. In the modification shown in Figs. 6, 7, 8 and 9 it is preferable to change the socket 91 when altering the direction that the crankshaft must be rotated when the engine is started. This is not required with the constructions shown in Figs. 10, 11 and 12.

In the construction shown in Fig. 8 the crank case of the internal combustion engine is designated 101. The two cylinder banks are designated as 102 and as 103 respectively and the casing of the supercharger is designated as 104. The supercharger is provided with two spirally arranged channels which are connected to the casing of the rotating vanes.

Of the various spur gears diagrammatically shown in Fig. 8 two pinions, the axes of rotation of which are swingable, are designated 105 and 107 respectively. The pinion 105 is mounted upon an eccentrically arranged carrier 108, as shown in Fig. 9. The latter is rotatably supported in the casing portion 123 of the crankshaft case 101 on a cylindrical pin 120. On the side opposite the pin 120 the eccentric mounting 108 carries a disc 106 which is in the shape of a parallelogram and which is provided with two diametrically arranged bores through which extend bolts 121. The bolts 121 are screwed into the wall 122 of the crank case 101. The axes of the bolts 121 are both arranged at the same distance from the central axis of the pin 120 of the carrier body 108. The pinion 105 may be swung by removing the two bolts 121, gripping the disc 106 of the carrier body 108 and turning it around 180°, whereby the eccentric portion of the carrier 108 is swung upwardly (see Fig. 9). Then the bolts 121 are again inserted into the holes of the disc 106 and screwed into the wall 122 of the crank case.

The pinion 107 is similarly journalled. The swingable disc of the eccentric bearing pin for this pinion 107 is designated as 106a.

Depending upon the position of the pinion 105, the pinion 105 engages either the main pinion 104 and the pinion 107 or only pinion 107. If the latter relationship is established, the pinion 107 engages pinion 104.

The main pinion 104 is mounted upon the crankshaft and rotates in the direction that the latter drives. Reversal must be made in such a manner that the drives of the auxiliary apparatus continue to rotate in a constant direction of rotation regardless of the direction of rotation of the crankshaft. For this purpose the pinion 105 can be brought out of engagement with the pinion 104. When this is done pinion 107 is swung to engage the pinion 104, but remains in engagement with the pinion 105. Consequently, for the opposite direction of rotation of the crankshaft the rotation of pinions 105 and 107 is so changed that all of the driving gears connected in train thereto continue to rotate in a constant direction.

The pinion 107 engages a pinion 109 upon the axis of which another pinion 110 is fixed engaging a pinion 111 fixed upon the shaft of the supercharger 104 by which the latter is driven.

The pinion 105 engages a pinion 112 which in turn engages another pinion 113. The latter engages a pinion 114 upon the shaft of which a pinion 115 is fixed. The pinion 114 rotates a pinion 116. The pinion 115 drives a pinion 117 engaging another pinion 118 which finally engages a pinion 119.

Some of the pinions mentioned serve to operate the generator or dynamo, the air compressor, the magneto ignition device, and the pumps.

If desired, the eccentric pins mounting the swingable pinions 105 and 107 may be rotated by means of a worm and gear to effect the change of positions mechanically.

In the construction shown in Figs. 10 and 11 a portion of the wall of the crank case is designated as 124. The crankshaft 125 is journalled in the slide bearing 126 and a reduced diameter end 129 of a sleeve 127 is mounted in one of the cheeks of the crank shaft 125. This sleeve 127 is journalled in a slide bearing 128 and is fixedly mounted to rotate with crankshaft 125 by means of a fitting pin 130. The interior of the end 129 of sleeve 127 is provided with axially extending ribs, teeth or serrations into which engage correspondingly shaped teeth or grooves 131 of resilient member 132. The other end of the member 132 is also provided with axially extending grooves, teeth serrations engaging in corresponding grooves or teeth in the sleeve 134. This sleeve partially surrounds the member 132 in spaced relation thereto. The end of the sleeve 134 nearer the crankshaft is provided with a portion 135 having at 136 exteriorly projecting teeth which engage axial grooves or teeth of the sleeve 129 and serve to transmit the power from the crankshaft to the sleeve 135. Projecting from the sleeve 134 is the body 137 of a spur gear 138. The gear body 137 and the sleeve 134 are made integral. Adjacent the body 137 a wall 139 is provided which serves as a bearing. In this wall 139 the sleeve 135 is rotatably journalled in a slide bushing 140 so that sleeve 134 and its associated member may be axially shifted.

The wall 139 carries another bearing bushing 141 in which a stub shaft 142 is rotatably journalled. This stub shaft 132 carries a hub 143 on which are formed the two gears 144 and 145. The gear 144 is smaller than the gear 145 and in the position of the gearing shown in Fig. 10 engages with the gear 138.

The other end of shaft 142 is journalled in a bearing bushing 146 in recess 147 of the wall 124 of the crank case.

The spur gear 145 engages with a spur gear 148 fixed upon the shaft 149 which is rotatably journalled in a slide bearing 150.

The shaft 149 is provided with a reduced end portion 151 upon which a hub 152 for vanes 153 of the supercharger is mounted. The hub 152 and the vanes 153 are prevented from being axially displaced by means of a shoulder 154 on the shaft 149. Air may be sucked for the supercharger 151—154 through the mouth 154a which air then is pressed into a channel 155. The latter is formed by a recess in the casing wall 124 and by a casing 156. The latter has an opening 157 through which a starting crank for starting the motor may be inserted.

Upon the aforementioned shaft 142 another gear 158 is fixed, the hub of which preferably is made integral with the hubs of the gears 143 and 145. Another gear 159 is fixed upon a sleeve-like hub 160. The hub 160 surrounds one end of the sleeve 134 and is provided with internal jaws or claws 161 which may be coupled with correspondingly shaped claws 162. These claws 162 are arranged upon the sleeve 134 and project outwardly. By axially shifting the sleeve 134 the claws 162 and 161 may be engaged and disengaged respectively. Moreover, the gear 138 may be disengaged from the gear 144 by an axial displacement of the sleeve 134.

In the position shown in Fig. 10 the gear 138 engages the gear 144 when the claws 162, 161 are out of engagement. In the position shown in Fig. 11 the gear 138 is out of engagement with the gear 144 and the claws 162 and 161 are coupled together.

The end 163 of the sleeve 160 projects into the casing 156. The sleeve body 160 is journalled in the wall 124 of the crank case. For this purpose bearing bushings 164 and 165 are provided between the sleeve body 160 and the wall 124. The bearing bushing 164 is directed towards the inside of the casing 124 and the bearing bushing 165 is directed towards the outside of the casing 124 and faces the space surrounded by the casing 156. The end portion 163 of the sleeve 160 projecting outwardly carries an external thread upon which is screwed a nut 166 by means of which the sleeve 160 may be axially fixed in position.

The end 163 of the sleeve 160 is provided with a recess 167 into which the starting crank may engage. The recess 167 is provided with other recesses not shown in the drawings which serve the same purpose as the corresponding recesses described in connection with the modification shown in Fig. 7.

In the recess 167 a bolt 168 is arranged having a hexagon head 169. The end of the bolt 168 carries a thread 170 and is screwed into the head 133 of the member 132 less deep in the position shown in Fig. 10 and deeper in as shown in Fig. 11. By means of this screw connection the rod 132 and the sleeve 135 coupled thereto together with associated gear 138 and the coupling claws 162 may be axially shifted on rotation of the bolt 168.

For instance, after rotation of the bolt 168, from the position shown in Fig. 10, the member 132 together with the sleeve 135 is shifted towards the right until the limit of the axial movement is reached by striking against an abutment, whereupon the position shown in Fig. 11 is obtained.

The outer periphery of the head 133 of the member 132 is provided with grooves or ribs 171 which engage in corresponding ribs or grooves of the portion 172 of the sleeve 134 and thereby form a coupling for transmitting the torque. The power, therefore, is transmitted from the crankshaft 125 by way of the grooves and ribs of the portion 131 of the member 132 to the other head 133 of this member. The grooves and ribs provided here transmit the power to the portion 172 of the sleeve 134. From the latter the power is transmitted to the gear 138 and the coupling claws 162 respectively. As soon as the member 132 is twisted a predetermined degree, the sleeve 135 is coupled to the sleeve 127 by means of the ribs 136. This method of coupling the ribs 136 provides that upon starting the resilient member 132 is not damaged or destroyed by counter torque. The ribs 136 have sufficient tangential play so that the crankshaft may operate normally after the motor has started.

The end 172 of the sleeve 134 is journalled in the sleeve 160 in a roller bearing 173. The right end of the end portion 172 of sleeve 134 is provided with a shoulder 175 against which bears a ball bearing 174 which is held against axial displacement by an expanding ring 176. An internal projection of the sleeve 160 is designated as 177. Axial displacement of the bolt 168 towards the right is prevented by the safety member 178 when the bolt 168 is rotated to move the member 132 towards the left and away from the stop 177.

In Fig. 10 the individual elements or members occupy the position adapted for a counter-clockwise rotation, whereas Fig. 11 shows the position of the individual elements adapted for a clockwise rotation. In the first position (Fig. 10) the main driving gear 138 is coupled through the gear 144 to the gear 159, the power from the gear 144 then being transmitted to the gear 159 through a gear 158 and another gear not shown in the drawings. The coupling claws 162 and 161 are out of engagement in this position. All other gears for the various auxiliary apparatus, as ignition device, supercharger, pumps and so on, are connected to the driving gear 159.

For rotation in a counter-clockwise direction (Fig. 11) the gear 138 is out of engagement with the gear 144. The gear 138 is coupled in this case to the gear 159 through the claws 162, 161. In this case the gears 138 and 159 have the same direction of rotation, whereas in the position shown in Fig. 10 the two gears rotate in opposite directions. A gear not shown in the drawings and positioned between the gear 158 and the gear 159 effects the reversal of the direction of rotation in the position of the individual elements as shown in Fig. 10. In the position of Fig. 10 the ball bearing 174 acts as thrust bearing as the gears 138 and 159 rotate in opposite directions.

In the modification shown in Fig. 12 the crankshaft 179, is provided at one end with a sleeve 180, which is journalled in a slide bearing 181. Into the sleeve 180 of the crankshaft 179 extends the shaft 183 which is a coupling member and is provided at one end with a head 184. The latter has axially extending grooves, teeth or serrations which engage in corresponding teeth or grooves 182 of the bore surrounding the shaft and thereby the turning torque is transmitted by the crankshaft to the shaft 183. With the rigid construction of the coupling shaft 183, the stops 251 shown in Fig. 7 may be dispensed with. The shaft 193 in this case is used as a resilient member for driving the supercharger.

The end 185 of the shaft 183 has a shoulder 186 which is formed a distance from the end of the shaft 183 which is equal to the longitudinal length of the head 184 provided at the other end of the shaft 183. The outer surface of the shoulder 186 is provided with axially extending grooves, ribs or serrations which cooperate with corresponding ribs or grooves 187 of bevel gears. The grooves or ribs are provided in the interior of a hub 188 which is rotatably journalled in a ball bearing 189 in the wall 190 of the crank case. The hub 188 carries a bevel gear 191 engaging a pinion 192, the axis of rotation of which is arranged vertically to the axis of rotation of the crankshaft 179 and the coupling shaft 183. The bevel gear 192 is fixed upon a shaft 193. The bevel gear 192 and the shaft 193 are arranged in a neck-journal bearing 194.

Another hub 196 surrounds the portion 185 of the shaft 183 and the inner wall of the hub is provided with grooves or ribs by means of which a coupling to corresponding grooves or ribs of the bolt can be made if the corresponding grooves or ribs engage each other. As the end portion 185 of the shaft is not provided with grooves or ribs, the gear 195 is not coupled to the shaft 183 but loosely rotates around this shaft. The hub 196 bears against the wall 198 of the crank case in a ball bearing 197. This portion of the case has an opening 199 by means of which access may be had to the gearing. Through this opening 199 a handle or starting crank may be inserted and applied to the head portion 200. The two ends of the hubs 188 and 196 facing each other are surrounded by a ring 201 which bears against the hubs by way of two further rings 202 and 203.

If the direction of rotation of the crankshaft 179 is changed, the direction of rotation of the shaft 193 which serves for driving the supercharger also would be changed. To provide, however, that the direction of rotation of the shaft 193 remains constant, the shaft 183, after loosening the members which hold it in its position, is axially withdrawn, turned end for end, and inserted again. Then the axial ribs of the head 184 of the shaft 183 engage corresponding ribs or grooves of the hub 196 so that now this hub 196 and gear 195 are positively coupled to the shaft 183 and also to the crankshaft, while the hub 188 and gear 191 are in idling position.

Due to this reversal the change of the direction of rotation of the crankshaft has no effect on the shaft 193.

A gear 204 fixed upon the hub 188 serves to drive all the auxiliary apparatus including the cam shaft. The gear 204 is, for a clockwise and counter-clockwise rotation of the crankshaft, always rotated in a constant direction.

What we claim is:

1. In an internal combustion engine, a crank shaft, a cam shaft, said cam shaft controlling the intake and exhaust valves and being adapted to change the order of actuation of said valves to change the order of firing of the cylinder of said internal combustion engine to effect reversal of direction of rotation of said crank shaft, and means adapted to be driven by said crank shaft in a constant direction to operate the electrical and fuel system of said engine regardless of the direction in which said crank shaft drives.

2. In an internal combustion engine capable of being reversed, a crank shaft, a cam shaft driven by said crank shaft, said cam shaft operating the intake and exhaust valves and being adapted to change the order of actuation of said valves to change the order of firing the cylinders of said engine, said reversal being effected by means including longitudinal shifting of said cam shaft to bring the cams into position for operation of the engine in reverse direction, and means controlled by said longitudinal shifting adapted to drive the electrical and fuel system in a constant direction.

3. In an internal combustion engine capable of being reversed, a crank shaft, a cam shaft driven by said crank shaft and adapted to be shifted longitudinally to effect reversal of said engine, two bevel gears mounted face to face on said cam shaft, and a pinion mounted to be driven by said bevel gears, said bevel gears being spaced apart a predetermined distance so that said bevel gears alternately mesh with said pinion as said cam shaft is shifted to its extreme positions, said pinion driving the electrical and fuel system of said engine in a constant direction regardless of the direction in which said crank shaft drives.

4. In an internal combustion engine, a crank shaft, a cam shaft driven by said crank shaft and adapted to be shifted longitudinally to effect reversal of said engine, means comprising two gears driven by said cam shaft, and adapted to alternately engage a pinion when said cam shaft is in its extreme position so as to drive auxiliary equipment in a constant direction regardless of the direction of rotation of said crank shaft.

OTTO NÜBLING.
ERICH WIRTHGEN.